United States Patent

Schicht et al.

[11] Patent Number: 6,020,077
[45] Date of Patent: *Feb. 1, 2000

[54] TRANSPARENT SUBSTRATE PROVIDED WITH A THIN-FILM STACK WITH PROPERTIES IN THE INFRARED

[75] Inventors: Heinz Schicht, Bethau; Wulf Häussler, Alsdorf; Herbert Schindler, Torgau; Gerhard Ditzel, Welsau; Uwe Schmidt, Falkenberg/Elster; Wilfried Kaiser, Torgau, all of Germany

[73] Assignee: Saint-Gobain Vitrage, Courbevoie, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/796,185

[22] Filed: Feb. 7, 1997

[30] Foreign Application Priority Data

Feb. 9, 1996 [DE] Germany .......................... 196 04 699

[51] Int. Cl.$^7$ .............................. B32B 17/06; C03C 27/02
[52] U.S. Cl. ......................... 428/622; 428/632; 428/673; 428/436; 428/432; 428/433; 428/469
[58] Field of Search .................................... 428/622, 632, 428/673, 432, 433, 469, 426

[56] References Cited

U.S. PATENT DOCUMENTS

| | | | |
|---|---|---|---|
| 5,110,662 | 5/1992 | Depauw et al. | 428/192 |
| 5,279,722 | 1/1994 | Szczyrbowski et al. | 204/192.27 |
| 5,296,302 | 3/1994 | O'Shaughnessy et al. | 428/472 |
| 5,376,455 | 12/1994 | Hartig et al. | 428/428 |

FOREIGN PATENT DOCUMENTS

| | | |
|---|---|---|
| 2051390 | 12/1990 | Canada . |
| 104 870 | 4/1984 | European Pat. Off. . |
| 0 076 975 | 4/1985 | European Pat. Off. . |
| 506 507 | 9/1992 | European Pat. Off. . |
| 32 11 753 C2 | 3/1985 | Germany . |
| 35 03 851 | 8/1986 | Germany . |
| 288 822 | 4/1991 | Germany . |
| 3940748 | 6/1991 | Germany . |
| 7- 315874 | 12/1995 | Japan . |

*Primary Examiner*—Paul Thibodeau
*Assistant Examiner*—Holly C. Rickman
*Attorney, Agent, or Firm*—Pennie & Edmonds LLP

[57] ABSTRACT

The invention relates to a transparent substrate, in particular glass substrate, provided with a thin-film stack including at least one metal film with properties in the infrared, in particular a low-emissivity one, arranged between two coatings which each include at least one anti-reflection film based on dielectric material, and at least one protective film based on a sacrificial metal or a partially or fully oxidized sacrificial metal or a sacrificial metal alloy placed between the said metal film and one of the said coatings. According to the invention, the film placed directly below and/or above the said metal film contains at least one of the noble metals Pd, Au, Ir, Pt and Rh. The low-level addition of one or more of these metals to the others, namely the film placed below and/or above the metal film, leads to an increase in the chemical stability and the hardness of the thin-film stack.

25 Claims, No Drawings

TRANSPARENT SUBSTRATE PROVIDED WITH A THIN-FILM STACK WITH PROPERTIES IN THE INFRARED

BACKGROUND OF THE INVENTION

The present invention relates to a transparent substrate, in particular a glass substrate, provided with a thin-film stack including at least one metal film with properties in the infrared, in particular a low-emissivity one, arranged between two coatings which each include at least one anti-reflection film based on dielectric material, and at least one protective film based on a sacrificial metal or a partially or fully oxidized sacrificial metal or a sacrificial metal alloy placed between the said metal film and one of the said coatings. According to the invention, the film placed directly below and/or above the said metal film contains at least one of the noble metals Pd, Au, Ir, Pt and Rh.

The thin-film stacks with this structure are described in a number of embodiments. They are deposited on an industrial scale, usually in continuous devices, on polymer sheets or glass panes, using the method of magnetic field-enhanced cathodic sputtering. Dielectric anti-reflection films consist mainly of metal oxide films which are sputtered from a metal target reacting in a working gas containing oxygen. The protective film placed between the silver film and the anti-reflection cover film therefore has the purpose, on the one hand, of protecting the underlying silver film, during the reactive sputtering of the anti-reflection cover film, from the oxidizing effect of the oxygen (EP 0 104 870 B1, DD 288 822) and also, on the other hand, of improving the long-term stability of the thin-film stack with regard to atmospheric attack (pollution, etc.).

In addition, document EP-0-433 136 B1 discloses a laminated heated window for a motor vehicle, including a pane covered with a multifilm which serves as a heating element and which comprises a conductive. silver film and a protective zinc oxide film which reduces reflection and, furthermore, on this protective film, a thin film of nickel-chromium or tantalum or an oxide of these metals which improves the stability of the multifilm and also improves the adhesion of the multifilm with which the pane is equipped to the thermoplastic insert.

It is also known that, in order further to improve the long-term stability of thin-film stacks of this type with regard to atmospheric attack, as well as the corrosion durability behaviour of the film, and the stability with regard to elevated temperatures, a protective film of a sacrificial metal or a sacrificial metal alloy is also deposited below the silver film (DE 4 109 708 C1).

The sacrificial metals found as protective films not only above, but also below the silver film are basically metals or metal alloys which have a relatively high affinity for oxygen and which bind with the oxygen which has diffused into these protective films, with the formation of the corresponding metal oxides. Because the protective films in the metallic state reduce the transmission of the thin-film stack, these protective films are preferably deposited in a thickness such that they are oxidized more or less completely during the subsequent reactive sputtering of the anti-reflection film and/or during a later heat treatment. Their protective effect relating to the corrosion durability behaviour of the thin-film stack is also obtained in their at least partially oxidized form.

Document DD 288 822 describes the sputtering of a protective metal film placed above the silver film, from a TiPd alloy target, where the quantity of Pd in the alloy is to be 0.1 to 1.0%. Using a protective alloy film of this type, the resistance to moisture and temperature as well as the long-term stability of the thin-film stack are increased.

Similarly, it is known that, in order to improve the stability of a thin-film stack of this type with regard to moisture and with regard to chemical attack, the silver film is protected on one or both of its faces by a special barrier agent, which consists of a double film with a first partial film of Pt and/or Pd and a second partial film of Ti and/or Cr, or of a single film made of an alloy with at least 15 atom % of one of these elements. If the barrier agent consists of two separate films, pure Pt and/or Pd targets must be used for its preparation, which entails high costs. The partial films of pure Pt and/or Pd also have the effect of lowering the transmission of the thin-film stack. The favourable effect of these known thin-film stacks, relating to chemical stability, relies on the presence of the noble metal film on the silver film, by virtue of which the latter is protected against extraneous attack.

SUMMARY OF THE INVENTION

The object of the invention is to improve the stability of the thin-film stacks of the abovementioned structure against moisture and against chemical attack, without this improvement being too penalizing in terms of cost.

According to the invention, the object is achieved in that the film placed directly below and/or above the metal film with properties in the infrared contains at least one of the metals Pd, Au, Ir, Pt and Rh.

DETAILED DESCRIPTION OF THE INVENTION

The invention is based on a fact which is known to those skilled in the art, according to which the essential properties of a thin-film stack containing a metal film with properties in the infrared are, amongst other things, determined by the structure and the constitution of this metal film, and that, for this, the structure and the constitution of this metal film, and also the composition and the constitution of the film below and/or above this metal film, are of fundamental importance. It has been shown that the noble metals mentioned above exert a particularly favourable effect on the structure of the metal film with properties in the infrared which is then deposited, and more or less independently of the materials which form the film located below and/or above the metal film with properties in the infrared. Surprisingly, this favourable effect is observed even if the noble metals mentioned above are present in a relatively low quantity, for example only 0.05% by weight.

As regards the mode of action of these noble metals in these small quantities on the growth phenomenon of the metal film with properties in the infrared, there is no definitive explanation. The favourable effect may, however, be due to the fact that a metallic seed of the noble metal is formed in and on a film containing a noble metal of this type, and that, because of the isomorphic nature of these noble metals in comparison with the metal of the metal film with properties in the infrared, the metal of the metal film with properties in the infrared is preferentially condensed on these metallic seeds during the sputtering and grows in a fashion which is particularly free of defects. By virtue of its particularly regular structure which is formed, the metal film may be sputtered with a lower relative thickness, for equal thermal performance, which promotes increased transmission of light. In particular, the surprising essential improvement in the mechanical hardness and the increase in the chemical stability of the stack seem to be related to the particularly defect-free structure of the metal film with properties in the infrared, which results from the structure according to the invention of the thin-film stack.

The metal film with properties in the infrared is preferably based on silver.

The invention may, for example, be embodied in such a way that one or more of the noble metals mentioned are introduced into the anti-reflection base film, when the metal film with properties in the infrared is deposited directly on this anti-reflection base film. In this case, it is best for the noble metal to be alloyed in the desired quantity with the metal of the target, which is sputtered reactively to make a dielectric anti-reflection film. During the oxidation of the other metal part during the reactive sputtering, the noble metal remains essentially metallic and forms the desired seeds.

According to a preferred embodiment, the invention achieves a further increase in the favourable effect when the film placed directly below and/or above the metal film with properties in the infrared is the protective film based on a sacrificial metal or a partially or fully oxidized sacrificial metal or a sacrificial metal alloy. The thin-film stacks with this structure have the advantage that, by virtue of the sacrificial metal, they also protect the metal film with properties in the infrared from the oxygen which penetrates from below, so that thin-film stacks of this type are also suitable for a subsequent high-temperature heat treatment, of the bending/tempering or annealing type.

The metals mentioned here, for example Ni, Fe, Co, Ge, Pb, Cr, W, Bi, As, Sb, Be, Zn, Ti, Sn, Zr, V, Ta, Mn, Cu, Nb and Al or alloys of these metals are suitable as metals for the sacrificial metal films.

A further improvement in the physical and chemical properties of the thin-film stack is achieved when, in another embodiment of the invention, a small quantity of 0.05 to 10%, preferably 0.1 to 5% by weight of the noble metals Pd, Au, Ir, Pt and Rh is mixed with the film placed directly below and/or above the said metal film with properties in the infrared.

The invention also allows the manufacture of windows with reflection properties in the infrared and/or properties in the solar radiation range with a thin-film stack such as the one described, in particular, in patent application EP-0-611 215 which includes at least one metal film with properties in the infrared, in particular a low-emissivity one, arranged between two coatings based on dielectric material and a coating, underlying the film with properties in the infrared, including at least one wetting coat which is adjacent to the said film and which comprises a film based on tantalum oxide or niobium oxide or zinc oxide.

Each metal film with properties in the infrared in the stack may be provided, on its faces, not with a single film of material but with a stack of films made of dielectric material. These materials may, in particular, consist of at least one of the following components: $Si_3N_4$, $ZnO$, $SnO_2$, $Ta_2O_5$, $Nb_2O_6$, $WO_1$, $TiO_2$.

The invention thus allows the manufacture of thermal insulation windows and/or solar protection windows of the type described in patent application EP-638 528, in which the substrate successively includes:
a first coating of dielectric material,
a first film with reflection properties in the infrared, in particular based on metal,
a second coating of dielectric material,
a second film with reflection properties in the infrared, in particular based on metal,
a third coating of dielectric material, the thickness of the first film with reflection properties in the infrared corresponding to about 50 to 80%, in particular 55 to 75%, and preferably 60 to 65%, of that of the second film with reflection properties in the infrared.

Other advantages and characteristics of the invention emerge from the following description of several embodiments, in which the properties achieved using the thin-film stacks according to the illustrative embodiments are compared with the properties of a thin-film stack prepared according to a comparative example. Furthermore, it is shown that the thin-film stacks according to the invention are much better than known thin-film stacks in terms of chemical stability and their hardness.

In order to evaluate the quality of the films, the following measurements and tests are carried out on the samples, in the following sequence:

a) Scrub tests after drawing (ASTMD 2486) to determine the hardness and mechanical strength, respectively.

b) Film resistance measurement, carried out according to the 4-point method using a resistance measuring instrument of the company veeco.

c) Emissivity measurement using an emissiometer of the company "Optical Sensors".

d) Corrosion test in the form of an instantaneous test with hydrochloric acid. Here, the samples are immersed in 0.01 N hydrochloric acid at a temperature of 38.5° C. for periods of different length.

e) Emissivity measurement. The increase in the emissivity by the corrosion test is furthermore a measure of the destruction of the film.

COMPARATIVE EXAMPLE

Float glass panes having a thickness of 6 mm are coated using a continuous magnetic field-enhanced cathodic sputtering device with the following thin-film stack:

| Anti-reflection base film | $SnO_2$ | 30 nm |
|---|---|---|
| Sacrificial metal | NiCr | 2 nm |
| Silver | Ag | 12 nm |
| Sacrificial metal | NiCr | 4 nm |
| Anti-reflection protective film | $SnO_2$ | 30 nm |

The NiCr targets for preparing the sacrificial metal films consist of 80% by weight of Ni and 20% by weight of Cr and have a purity index of 99.8%.

The measurements and tests carried out give the following values:

Scrub test: after 350 brush strokes under water, several small and medium scratches are visible, but without any of the film being removed;

Film resistance: 8.5–9 ohms/unit area

Emissivity before the corrosion test: 9.0–10%

Emissivity after the corrosion test: 25%

(Immersion period=8 minutes).

ILLUSTRATIVE EMBODIMENT 1

Float glass disks having a thickness of 6 mm are prepared using the same device as for the comparative example and under the same procedural conditions, with a thin-film stack with the same structure as in the comparative example, the only change being that, in order to prepare the sacrificial metal film below the silver film, use is made of an NiCr target with the composition used in the comparative example, which is alloyed with 0.2% by weight of Pd.

Measurements and tests on these samples give the following values:
Scrub test: after more than 1000 brush strokes under water, no scratching, none of the film removed;
Film resistance: 7.9–8.2 ohms/unit area
Emissivity before the corrosion test: 7–8%
Emissivity after the corrosion test: 7–8%
(Immersion period=150 minutes).

ILLUSTRATIVE EMBODIMENT 2

Float glass disks having a thickness of 6 mm are again prepared using the same device as for the comparative example and under the same procedural conditions, with a thin-film stack with the same structure as in the comparative example, but with the change that the sacrificial metal film between the anti-reflection base film and the silver film has a thickness of 1 nm and is sputtered from a pure nickel target, which is alloyed with 1% by weight of Pd.

Measurements and tests on these samples give the following values:
Scrub test: 1500 brush strokes under water without visible scratching or removal of the film;
Film resistance: 7.5–8 ohms/unit area
Emissivity before the corrosion test: 7%
Emissivity after the corrosion test: 7%
(Immersion period=150 minutes).

ILLUSTRATIVE EMBODIMENT 3

Float glass panes having a thickness of 6 mm were again provided with a thin-film stack with five films and having the following structure, using the same device as for the comparative example under the same procedural conditions:

| | | |
|---|---|---|
| Anti-reflection base film | $SnO_2$ | 30 nm |
| Sacrificial metal | NiCr + 0.4% Pd | 2 nm |
| Silver | Ag | 12 nm |
| Sacrificial metal | Ti + 1% Pd | 4 nm |
| Anti-reflection protective film | $SnO_2$ | 30 nm |

In this case, the target for the lower sacrificial metal film is also composed of an Ni alloy (80% by weight of Ni, 20% by weight of Cr), which is alloyed with 0.4% by weight of Pd. The upper sacrificial metal film is sputtered from a titanium target which is alloyed with 1% by weight of Pd.

This thin-film stack has even better properties relating to the corrosion behaviour. This thin-film stack withstands the acid test according to standard DIN 50021 for a period of 24 hours, without exhibiting any essential film defect.

It is claimed:

1. Transparent coated substrate provided with a thin-film stack, said thin film stack comprising:
   at least one lower anti-reflection film made of a dielectric material;
   at least one upper anti-reflection film made of a dielectric material;
   at least one metal film having low emissivity in the infrared disposed between said lower anti-reflection film and said upper anti-reflection film;
   at least one protective film made of a sacrificial metal, a partially or fully oxidized sacrificial metal, or a sacrificial metal alloy disposed between said metal film and said upper anti-reflection film; and
   an anti-reflection film containing a noble metal component comprising Pd, Au, Ir, Pt, Rh or mixtures thereof in an amount of between about 0.05% and 10% by weight which is disposed directly below said metal film.

2. The coated substrate according to claim 1 wherein said at least one protective film contains a noble metal component comprising Pd, Au, Ir, Pt, Rh or mixtures thereof.

3. The coated substrate according to claim 1 wherein the metal film is silver.

4. The coated substrate according to claim 1 wherein the substrate is glass.

5. The coated substrate according to claim 1 wherein the protective film contains one or more metals selected from the group consisting of Ni, Fe, Co, Ge, Pb, Cr, W, Bi, As, Sb, Be, Zn, Ti, Sn, Zr, V, Ta, Mn, Cu, Nb and Al.

6. The coated substrate according to claim 2 wherein the protective film contains 70 to 90% by weight of Ni, 5 to 25% by weight of Cr and 0.05 to 5% by weight of the noble metal component.

7. The coated substrate according to claim 1 wherein the anti-reflection film disposed directly below the metal film has a thickness of about 0.5 to 2 nm.

8. The coated substrate according to claim 1 wherein the protective film has a thickness of about 1 to 10 nm.

9. The coated substrate according to claim 1 wherein the protective film has a thickness of about 1 to 5 nm.

10. The coated substrate according to claim 1 wherein the at least one metal film comprises two or more metal films.

11. Transparent coated substrate provided with a thin-film stack, said thin film stack comprising:
    at least one lower anti-reflection film made of a dielectric material;
    at least one upper anti-reflection film made of a dielectric material;
    at least one metal film having low emissivity in the infrared disposed between said lower anti-reflection film and said upper anti-reflection film;
    at least one lower protective film made of a sacrificial metal, a partially or fully oxidized sacrificial metal, or a sacrificial metal alloy, which is disposed between said metal film and said lower anti-reflection film directly below said metal film and which contains at least on noble metal selected from the group consisting of Pd, Au, Ir, Pt, and Rh in an amount of between about 0.05% and 10% by weight; and
    at least one upper protective film made of a sacrificial metal, a partially or fully oxidized sacrificial metal, or a sacrificial metal alloy disposed between said metal film and said upper anti-reflection film.

12. The coated substrate according to claim 11 wherein said at least one upper protective film contains a noble metal component comprising Pd, Au, Ir, Pt, Rh or mixtures thereof.

13. The coated substrate according to claim 11 wherein the metal film is silver.

14. The coated substrate according to claim 11 wherein the substrate is glass.

15. The coated substrate according to claim 11 wherein the upper protective film and the lower protective film contain one or more metals selected from the group consisting of Ni, Fe, Co, Ge, Pb, Cr, W, Bi, As, Sb, Be, Zn, Ti, Sn, Zr, V, Ta, Mn, Cu, Nb and Al.

16. The coated substrate according to claim 11 wherein the lower protective film contains 70 to 90% by weight of Ni, 5 to 25% by weight of Cr and 0.05 to 5% by weight of the noble metal component.

17. The coated substrate according to claim 12 wherein the upper protective film contains 70 to 90% by weight of Ni, 5 to 25% by weight of Cr and 0.05 to 5% by weight of the noble metal component.

18. The coated substrate according to claim 11 wherein the film disposed directly below the metal film has a thickness of about 0.5 to 2 nm.

19. The coated substrate according to claim 11 wherein the upper and lower protective films each have a thickness of about 1 to 10 nm.

20. The coated substrate according to claim 19 wherein the upper and lower protective films each have a thickness of about 1 to 5 nm.

21. The coated substrate according to claim 11 wherein the at least one metal film comprises two or more metal films.

22. A low-emissivity monolithic or laminated window comprising the coated substrate according to claim 1.

23. A low-emissivity monolithic or laminated window comprising the coated substrate according to claim 11.

24. Transparent coated substrate provided with a thin-film stack, said thin film stack comprising:
- at least one lower anti-reflection film made of a dielectric material;
- at least one upper anti-reflection film made of a dielectric material;
- at least one metal film having low emissivity in the infrared disposed between said lower anti-reflection film and said upper anti-reflection film;
- at least one protective film made of a sacrificial metal, a partially or fully oxidized sacrificial metal, or a sacrificial metal alloy disposed between said metal film and said upper anti-reflection film; and
- an anti-reflection film containing a noble metal component comprising Au, Ir, Rh or mixtures thereof which is disposed directly below said metal film.

25. Transparent coated substrate provided with a thin-film stack, said thin film stack comprising:
- at least one lower anti-reflection film made of a dielectric material;
- at least one upper anti-reflection film made of a dielectric material;
- at least one metal film having low emissivity in the infrared disposed between said lower anti-reflection film and said upper anti-reflection film;
- at least one lower protective film made of a sacrificial metal, a partially or fully oxidized sacrificial metal, or a sacrificial metal alloy, which is disposed between said metal film and said lower anti-reflection film directly below said metal film and which contains at least on noble metal selected from the group consisting of Au, Ir, and Rh; and
- at least one upper protective film made of a sacrificial metal, a partially or fully oxidized sacrificial metal, or a sacrificial metal alloy disposed between said metal film and said upper anti-reflection film.

* * * * *